Jan. 8, 1924. 1,479,980
A. B. CADMAN ET AL
DUMPING VEHICLE
Filed May 24, 1922   5 Sheets-Sheet 5
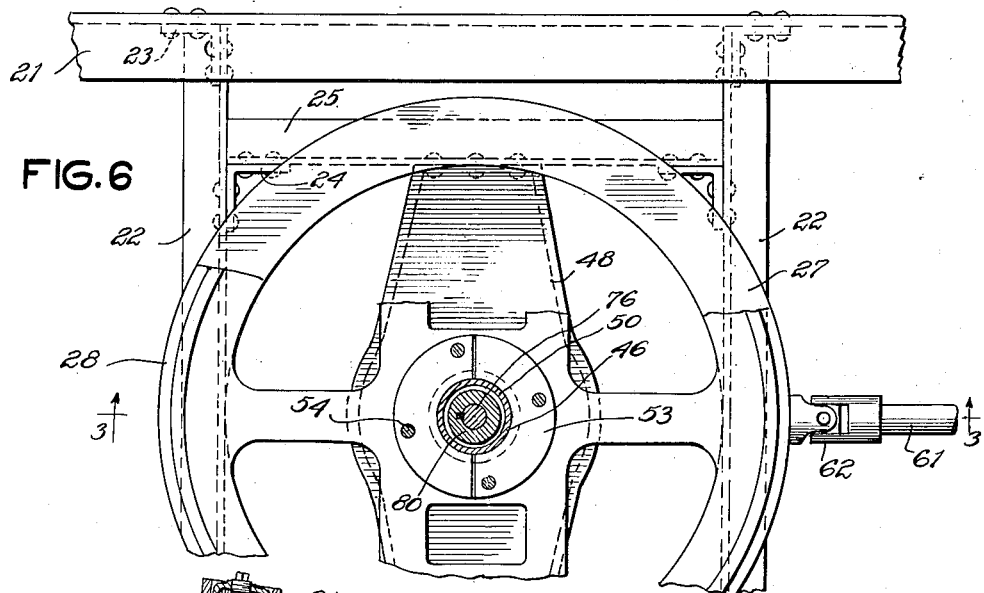
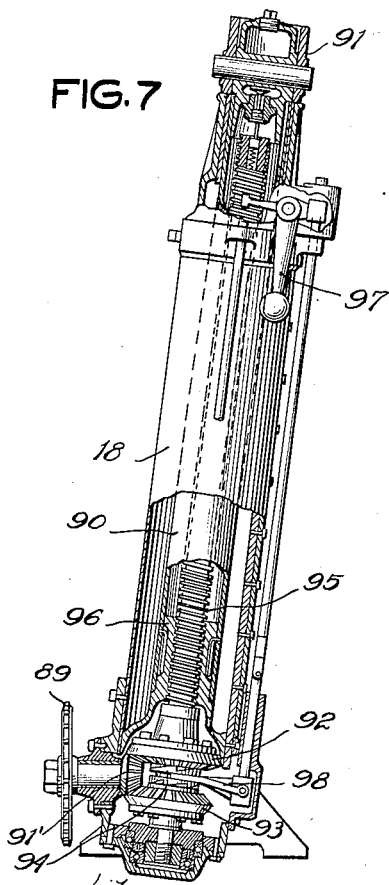
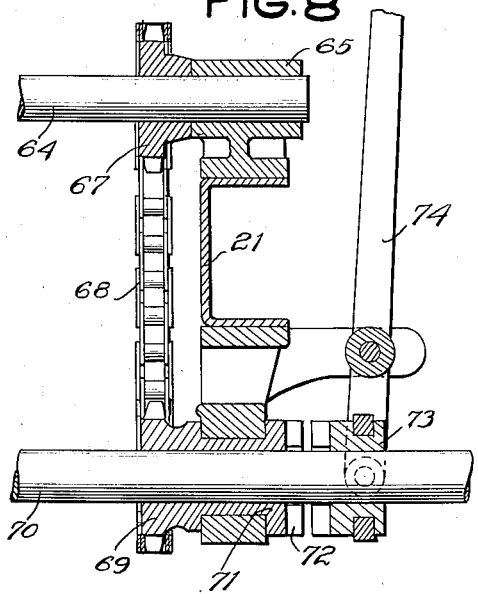
Inventors
Addi B. Cadman
Edwin H. Allen
By Chindahl Parker & Carlson
Attys
Witness
John E. Titus Patented Jan. 8, 1924.

1,479,980

UNITED STATES PATENT OFFICE.

ADDI B. CADMAN AND EDWIN H. ALLEN, OF BELOIT, WISCONSIN, ASSIGNORS TO WARNER MANUFACTURING COMPANY, OF BELOIT, WISCONSIN, A CORPORATION OF WISCONSIN.

DUMPING VEHICLE.

Application filed May 24, 1922. Serial No. 563,216.

*To all whom it may concern:*

Be it known that we, ADDI B. CADMAN and EDWIN H. ALLEN, citizens of the United States, residing at Beloit, in the county of Rock and State of Wisconsin, have invented a certain new and useful Dumping Vehicle, of which the following is a specification.

This invention relates generally to a novel combination vehicle which comprises a truck unit and a trailer unit, the latter being of the type commonly known as a semi-trailer, which has its rear end supported upon wheels on the ground and its forward end resting upon and connected to the truck unit; and the general object of the invention is to provide in a vehicle of this character a dumping body and a hoist therefor on the trailer unit, and mechanical driving means for operating said hoist from the motor of the truck unit.

One of the principal objects of the invention resides in the provision of hoist operating means of the kind referred to which comprises transmission operating through the fifth wheel which forms a part of the swivel connection between the truck and the trailer.

Another object of the invention lies in the provision of an improved form of mounting for the trailer body upon the truck permitting of practically universal relative movement between the truck and trailer when in operation on the road, the hoist operating connection comprising an extensible universal joint whereby the operative relation is maintained in all positions which the trailer may assume with respect to the truck in operation.

Figure 1:
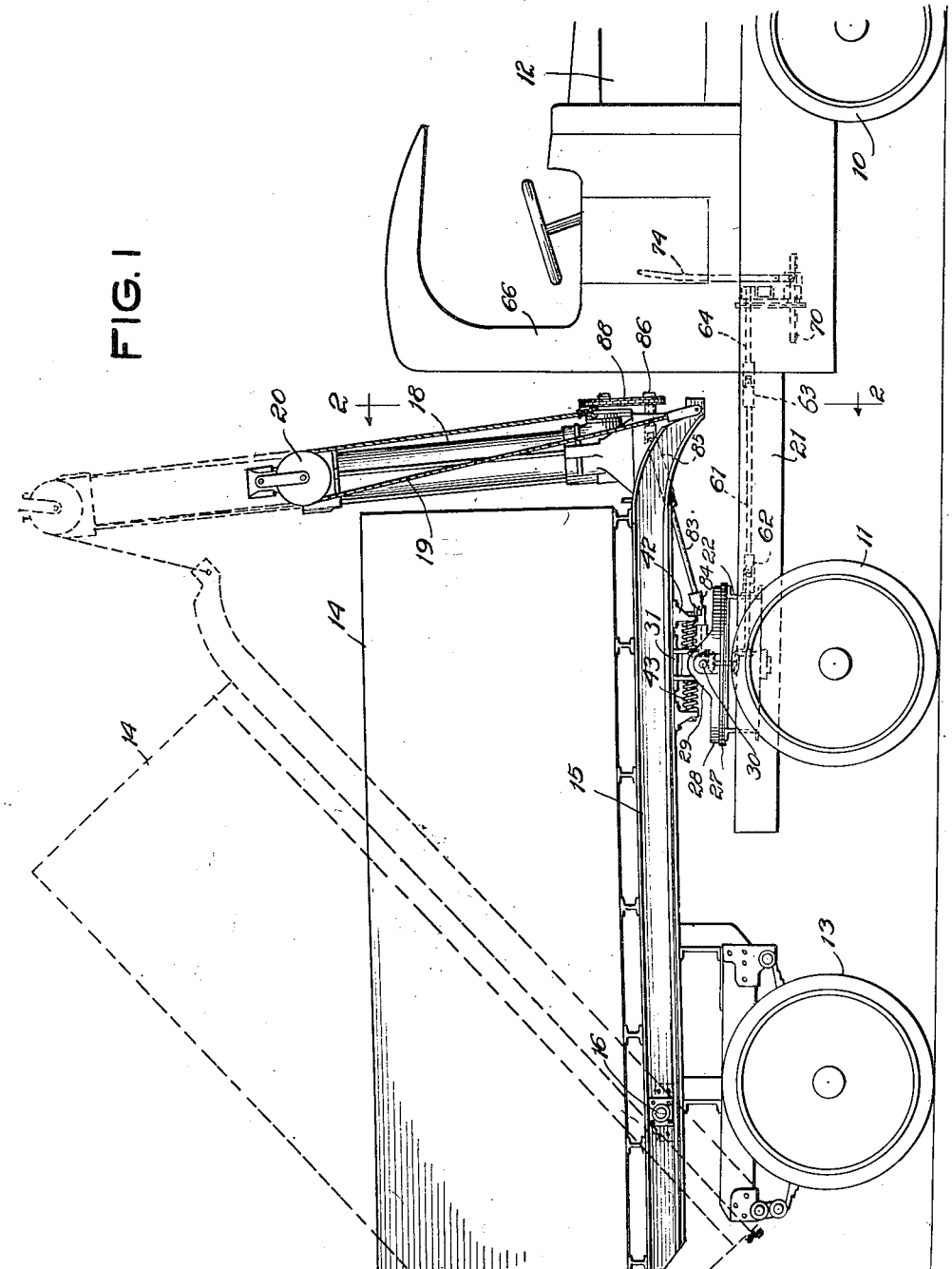
Figure 2:
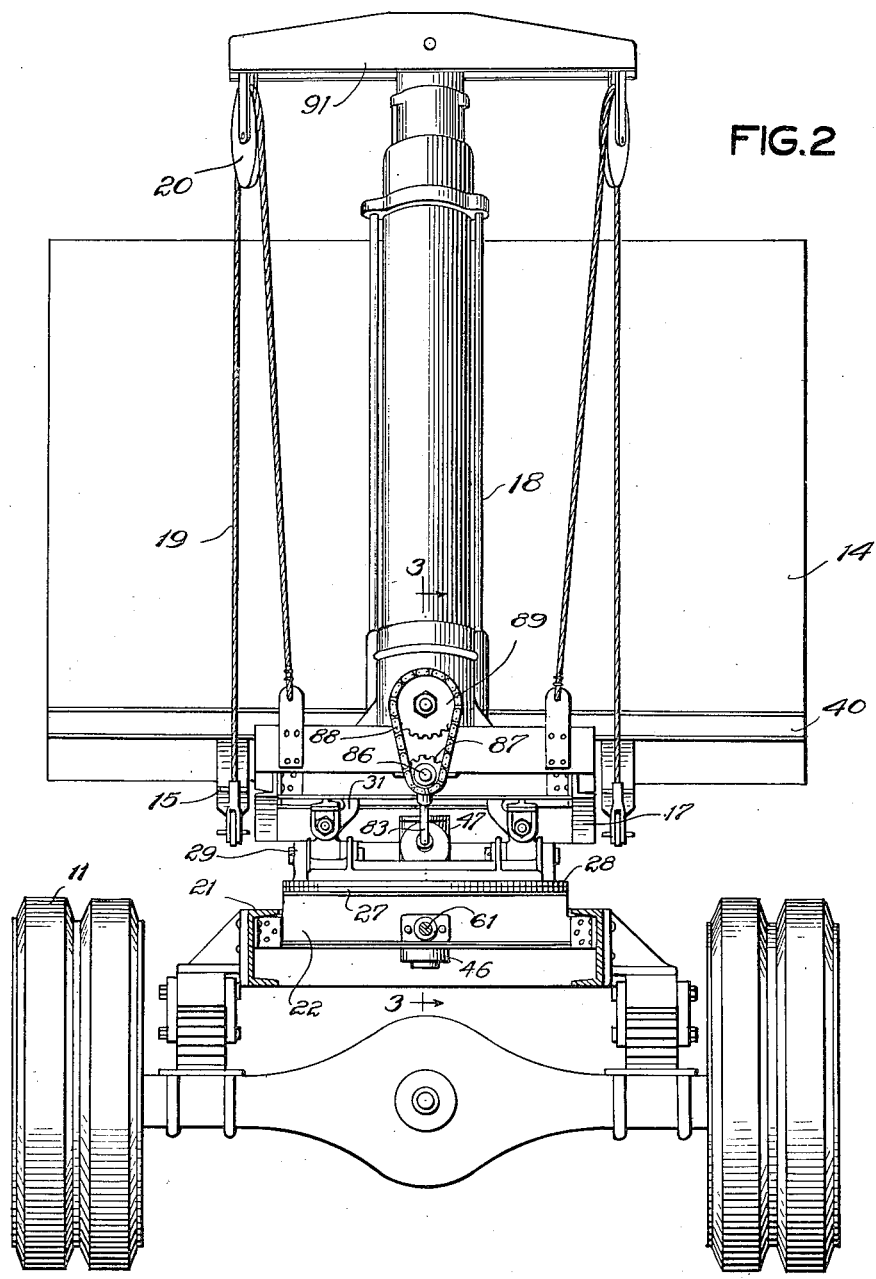
Figure 3:
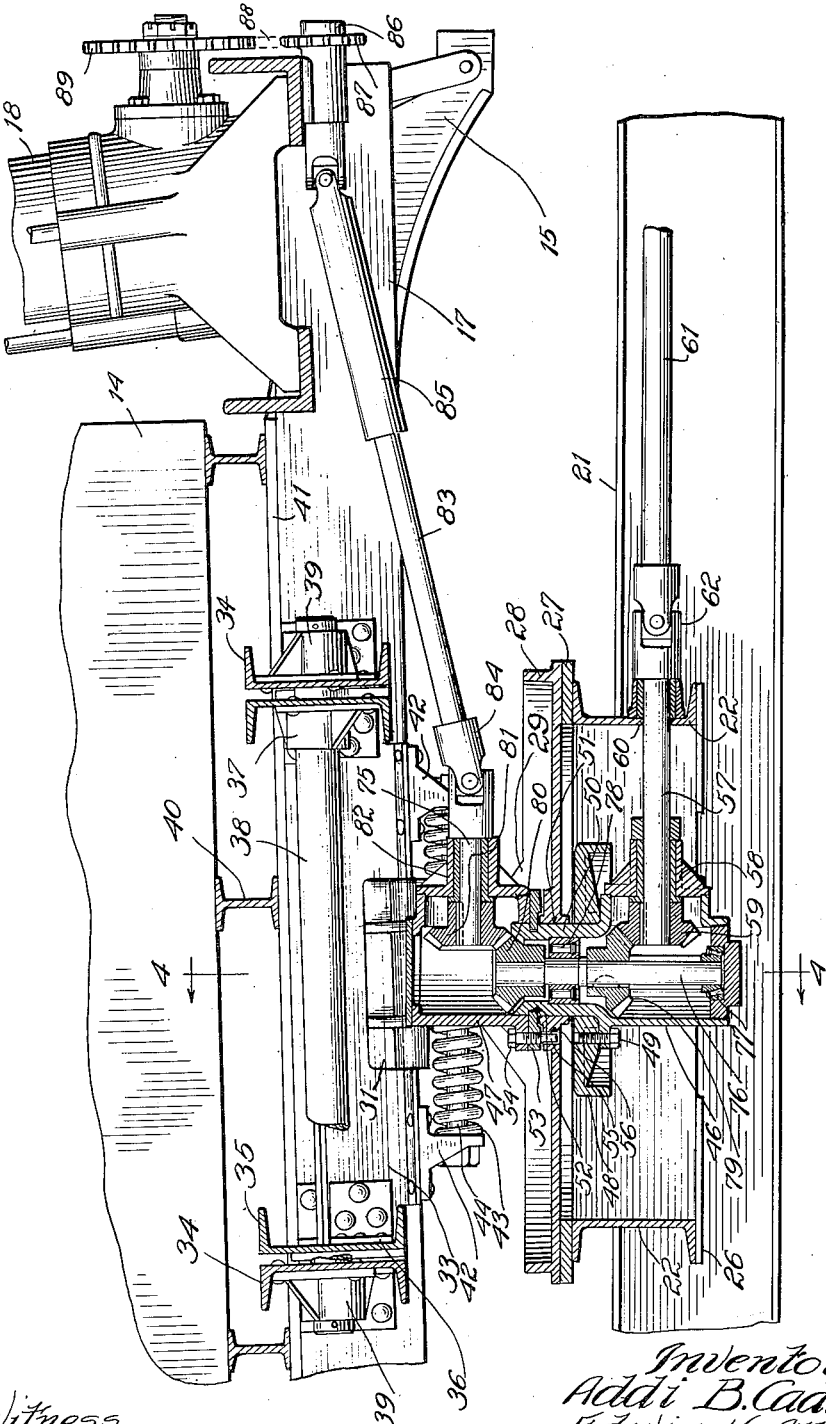
Figure 4:
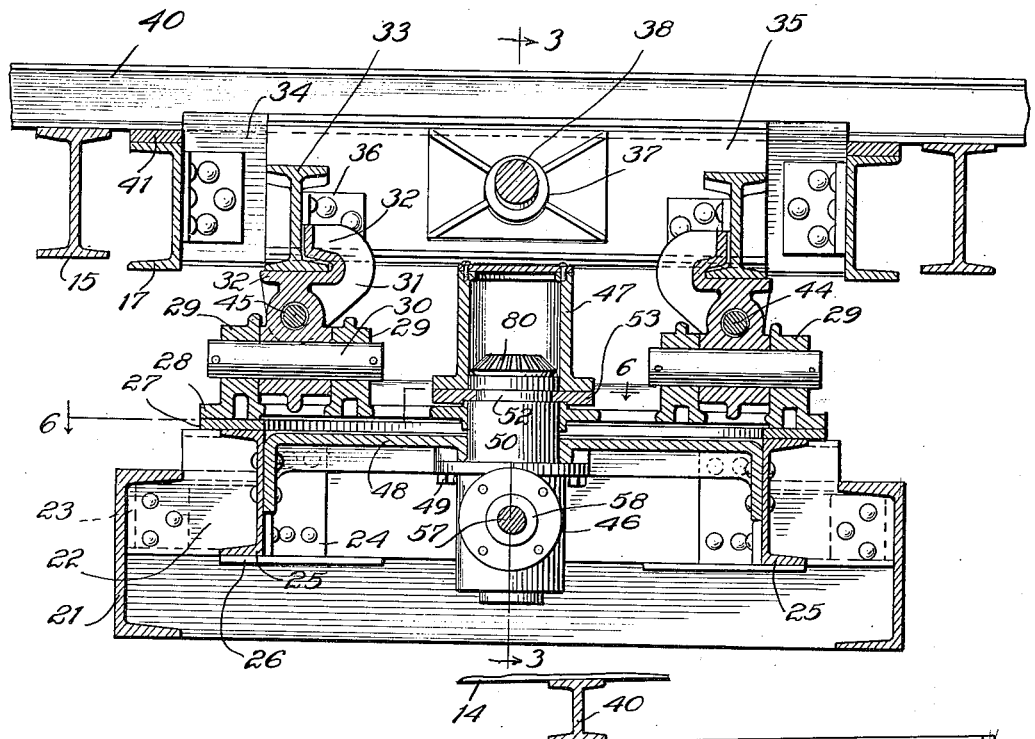
Figure 5:
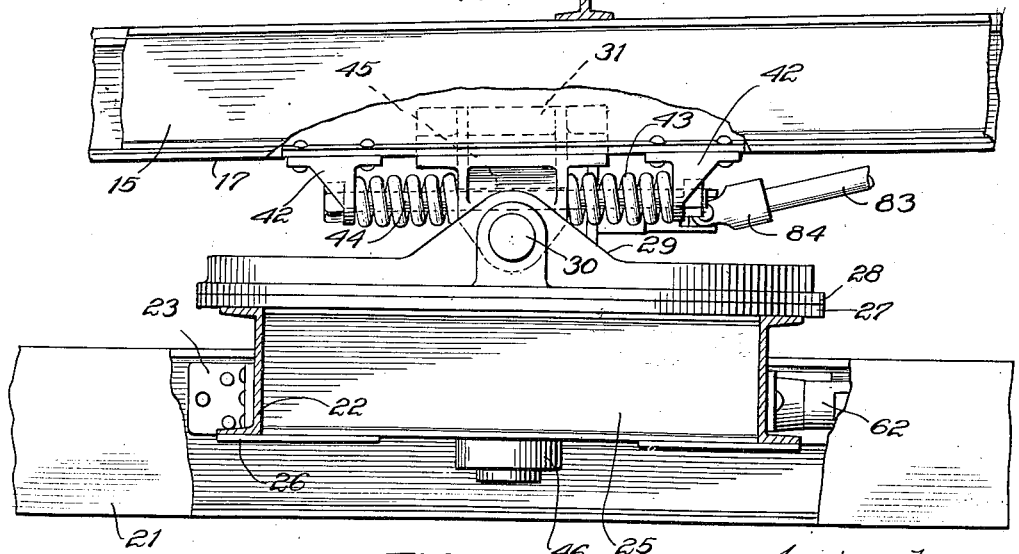

These and other objects of our invention will be pointed out more fully in the following detailed description. In the description reference is made to the accompanying drawings forming a part hereof, wherein Figure 1 is a side elevation of a combination vehicle of the kind referred to equipped with hoist operating means in accordance with the present invention. Fig. 2 is a transverse vertical section through the truck looking back at the trailer and is taken on the line 2—2 of Fig. 1. Fig. 3 is an enlarged longitudinal sectional detail through the fifth wheel showing the connections between the truck and trailer for operating the hoist and also showing the mounting of the trailer upon the fifth wheel which permits of universal relative movement between the truck and the trailer. This view is taken approximately on the line 3—3 of Fig. 2. Fig. 4 is a section at right angles to Fig. 3 taken through the center of the fifth wheel on the line 4—4 of Fig. 3. Fig. 5 is a view partly in section and partly in elevation looking at the side of the fifth wheel. Fig. 6 is a fragmentary horizontal sectional detail taken on the line 6—6 of Fig. 4. Fig. 7 is an enlarged isolated detail partly in section and partly in elevation of the hoist for operating the dumping body on the trailer. Fig. 8 is a fragmentary enlarged sectional detail of the power take-off showing the clutch for transmitting power from the power unit of the truck to operate the hoist.

Throughout the views the same reference numerals refer to the same parts.

While we have preferred herein to illustrate our invention as embodied in a vehicle of the rear dumping semi-trailer type having a mechanical hoist operating vertically for tilting the dumping body, it is to be distinctly understood that such illustration is merely for the purpose of conveying an understanding of the invention broadly speaking and is not to be construed in any wise as limiting the invention merely to application to vehicles of this particular type; that in fact the invention finds special utility in connection with the operation of trailers of practically all types employing pneumatic or hydraulic or other types of hoists operating either vertically or horizontally or in other manners. With this foreword it will be understood that in the following description, while the invention will be described with considerable particularity and specification, the same is to be limited in the appended claims only so far as is necessitated by the state of the prior art.

The invention is illustrated in connection with a truck having the usual front steering wheels 10 and rear traction or driving wheels 11 driven in a suitable manner by a motor or other power unit housed ordinarily beneath the hood 12. A trailer arranged to be drawn by the truck has the usual load supporting trailing wheels 13 and is herein shown as having a rear dumping body 14 carried on an auxiliary frame 15 pivoted at 16 to the main frame 17 of the trailer. The body 14 is arranged to be raised and lowered by a hoist 18 in any usual or preferred manner. Herein the forward end of the frame 15 is connected at opposite sides with the hoist 18 by means of cables 19 operating on sheaves 20 in a manner well understood in this art. The details of the operating mechanism in the hoist will presently be described.

The truck frame 21, which is usually constructed of channel irons, is spanned by two cross pieces 22 riveted or otherwise secured to the sides of the frame by means of angle plates 23 or the like. Secured to these cross pieces suitably in a similar manner by means of angle plates 24 are longitudinal struts or braces 25 forming with the cross pieces 22 an intermediate rectangular frame between the sides of the truck frame 21. This frame forms the support for the fifth wheel of the truck and is preferably reinforced at the corners thereof as, for example, by means of gusset plates 26. A circle plate 27 forming the lower half of the fifth wheel is bolted or otherwise suitably secured upon this intermediate frame and constitutes a support for the other half of the fifth wheel which is in the form of a turn table or upper circle plate 28 superimposed upon the plate 27.

The turn table 28 has pairs of spaced bearing lugs 29 at diametrically opposite sides in which are engaged pins 30 for pivotally supporting shoes 31. These shoes have jaws 32 to fit the lower flanges of the side pieces 33 of a subframe pivotally supported between cross pieces 34 between the sides of the main frame 17 of the trailer and serve to permit relative longitudinal tilting between the tractor and trailer as will presently appear. This subframe, the cross pieces 35 of which are riveted or otherwise secured to the side pieces 33 at the corners suitably by means of angle plates 36, has bearing boxes 37 riveted or otherwise secured to the forward and rear cross pieces 35 thereof to receive a central longitudinally extending shaft 38. The shaft 38 projects beyond the ends of the subframe and bears in similar bearing boxes 39 riveted or otherwise secured to the cross pieces 34. The subframe, as most clearly appears in Fig. 4, is rectangular in form and substantially narrower than the main frame 17 of the trailer and, being pivotally mounted in the middle thereof, is adapted to permit relative lateral rocking movement between the truck and the trailer. The cross beams 40 of the trailer body 14 which rest upon the side members of the auxiliary frame 15 of the trailer provide ample clearance for the movement of the subframe in operation. These cross beams are preferably arranged to come to rest upon wooden strips 41 extending along the top of the sides of the trailer main frame 17 in order to deaden the sound of the impact when the dumping body is lowered to rest upon the main frame.

The shoes 31 besides serving as a pivotal support for the subframe of the trailer whereby to permit relative tilting between the truck and trailer, are adapted to permit a limited amount of relative longitudinal movement between the trailer and the truck in operation so that virtually a lost motion operating connection is afforded between the truck and trailer. These shoes are movable upon the lower flanges of the side pieces 33 of the subframe between brackets 42 riveted or otherwise permanently secured upon the side pieces and are yieldingly urged toward the normal middle position illustrated by means of coiled tension springs 43. The latter are preferably held in position by the guide bolt 44 extending between the brackets 42 through openings 45 in the shoes 31. The connection between the truck and trailer is therefore a resilient lost motion operating connection which is arranged to compensate for slight irregularities in the application of traction and to relieve the communication of strains and jars generally to the truck and trailer which otherwise arise from sudden starting and stopping and from road shocks. The connection afforded by the subframe and its pivotal mounting in the main frame of the trailer and upon the turn table 28 may be likened to a universal joint connection operative between the truck and the trailer permitting relative longitudinal tilting movement between the truck and the trailer and likewise relative lateral rocking movement.

Disposed at the center of the fifth wheel and normally arranged in superimposed relation are two hollow swiveling housing sections 46 and 47 which provide a swivel connection between the sections of the turn table or fifth wheel comprising the plates 27 and 28. The housing section 46 is suspended from a bracket 48 extending between the side pieces 25 of the intermediate frame of the truck. The bracket 48 is riveted or otherwise permanently secured in the intermediate frame and has the housing section 46 rigidly secured thereto preferably by means of cap screws 49. The housing section 46 has a reduced cylindrical neck portion 50 which protrudes through a central opening 51 in the turn table 28 and fits in the hollow housing section 47. (See Fig. 3.) An annular groove 52 provided on the neck 50 adjacent its outer end is arranged to receive a split locking ring 53 secured to the housing section 47 by means of the cap screws 54. This ring permits quick assembling of the housing and, it will appear, also permits their separation should this at any time become necessary or desirable. It will, however, be understood that it is not contemplated that the trailer is to be uncoupled from the truck in ordinary practice. The screws 54 have dowel ends 55 protruding into holes 56 in the turn table 28 in order to hold the housing section 47 against relative rotation with respect to the turn table 28 but permitting, of course, swivel movement between the two housing sections and holding the sections securely together.

A drive shaft 57 is journalled in a bearing 58 in the housing section 46 and has a bevel pinion 59 keyed upon the inner end thereof. The shaft 57 extends through an opening 60 in the cross piece 22 of the intermediate frame of the truck and is driven by a shaft 61 through a universal joint 62. The shaft 61 extends forward in the truck frame and has connection preferably through another universal joint 63 with a stub shaft 64. The latter has a bearing 65 preferably upon a cross piece of the truck frame 21 beneath the driver's seat in the cab 66 and is suitably driven by a sprocket pinion 67 by means of a sprocket chain 68 operating upon the sprocket pinion 69 on the power take-off shaft 70. The latter may be the drive shaft of the truck or a countershaft driven from the drive shaft and operates therefore continuously so long as the motor of the truck is in operation. The shaft 70 turns freely in the sprocket pinion 69 and the latter has an extension hub 71 the front face of which is provided with clutch teeth 72 for engagement with the clutch teeth of a continuously driven clutch collar 73 keyed upon the shaft 70 whereby the pinion 69 is arranged to be driven. The clutch collar 73 is shiftable manually by means of a lever 74 within reach from the driver's seat.

The drive shaft 57 operates a driven shaft 75 through an intermediate shaft 76 which extends between the housing sections 46 and 47 centrally thereof and axially with respect to the fifth wheel. This shaft has a suitable thrust bearing 77 and a roller bearing 78 and has bevel pinions 79 and 80 keyed thereon to turn therewith. The pinion 79 meshes with the pinion 59 on the drive shaft 57, while the pinion 80 meshes with another bevel pinion 81 on the driven shaft 75. The latter is mounted in a bearing 82 in the housing section 47 and is arranged to turn the operating shaft 83 through a universal joint 84. While it will, of course, be appreciated that the shaft 83 could be used for other purposes, we have herein preferred to illustrate the same as being used for the operation of the hoist for the trailer dumping body. An extensible universal joint 85 has a splined connection with the shaft 83 and serves to transmit power to the stub shaft 86. The latter has a sprocket pinion 87 keyed thereon over which a sprocket chain 88 passes to transmit power to the sprocket 89 to operate the hoist 18. The extensible universal joint 85 is provided to compensate for relative longitudinal tilting or lateral rocking between the trailer and the truck arising in operation, while the gearing in the hoist operating connection just described serves to maintain operative relation in all relative angular positions which the trailer may assume with respect to the truck.

The hoist 18 is illustrated in detail in Fig. 7. While, as above inferred, the hoist to be employed may be of any desired or suitable form, we prefer to employ a hoist of the type herein shown. The latter comprises a plunger 90 having a cross arm 91 on its upper end which carries the sheaves 20 before referred to and which in its up and down movements with the plunger is arranged to raise and lower the dumping body 14 of the trailer by means of the cables 19 in a well known manner. The sprocket gear 89 in the type of hoist selected for illustration operates a bevel pinion 91′ meshing with opposed bevel gears 92 and 93 the faces of which are provided with clutch teeth (not shown). A clutch collar 94 having clutch teeth on its opposite ends is splined to the screw shaft 95 and is adapted to be shifted into engagement with the clutch face of either of the gears 92 or 93 whereby to turn the screw shaft 95 in either of two opposite directions to raise and lower the plunger 90 by the coaction of the threads of the screw shaft with the nut 96. A control lever 97 pivoted to the upper end of the hoist may be swung manually to operate the yoke 98 to move the clutch collar into engagement with one of the bevel gears to effect a desired operation of the hoist. Assuming that the dumping body 14 of the trailer is to be raised, the lever 97 will be thrown to the right to move the clutch collar 94 into engagement with the gear 92. Thereupon when the lever 74 has been shifted to engage the clutch collar 73 with the teeth 72 of the sprocket pinion 69 the central screw shaft 95 of the hoist 18 will be operated through the transmission above described to turn in one direction to raise the plunger 90. When the dumping body has been raised to a predetermined point a suitable trip is preferably operated automatically to throw the lever 97 to the left to disengage the clutch collar 94 from engagement with the clutch face of the gear 92 and to move the same into engagement with the clutch face of the gear 93 to turn the screw shaft 95 in a reverse direction to return the plunger to its normal lowered position.

The operation of the unit does not appear to require any further explanation, the details of the various portions of the structure having been described largely in terms of their use and in their relation to other portions of the structure.

While we have herein described our invention as exemplified in a particular embodiment, it is to be understood that the invention is capable of modification in its various details without departing from the spirit of the invention. In the appended claims it will therefore be the endeavor to comprehend all legitimate modifications and adaptations of the invention which would occur to one skilled in the art to which the invention relates.

We claim as our invention:

1. The combination with a truck unit, a trailer unit, a hoist on said trailer unit, and a device joining said units and comprising a fifth wheel, of power means on the truck unit, and an operating connection between said power means and said hoist comprising a shaft extending axially through said fifth wheel.

2. The combination of a truck unit, a trailer unit, a device joining said units and comprising a fifth wheel structure, a hoist on said trailer unit, power driving means on said truck unit, a rotary shaft mounted axially in said fifth wheel structure, means connecting one end of said shaft to said hoist, and means connecting the other end of said shaft to said power means.

3. A combination vehicle of the character described comprising, in combination, a truck unit, a trailer unit having a pair of wheels on its rear end resting upon the ground and having its forward end overlapping and supported upon the truck unit, means for providing a universal connection between the front end of the trailer unit and the truck unit, said trailer unit comprising a rearwardly dumping body, a hoist mounted on the forward end of the trailer unit and arranged to raise the forward end of the body, and a gearing driving connection between said hoist and the motor on the truck unit, said driving connection including gears disposed coaxial with the universal connecting means between said two units.

4. A combination vehicle of the character described comprising, in combination, a motor driven truck unit, a trailer unit having a dumping body and a hoist therefor, said trailer unit having a pair of wheels supporting its rear end from the ground and having its forward end overlapping and resting upon the truck unit, an operative connection between the overlapping parts of said units, and a mechanical power drive passing axially through and detachable at said connection and serving to operatively connect said hoist to the motor on the truck unit.

5. The combination with a truck unit, a trailer unit, and a towing connection between said units permitting swivel movement therebetween, of a rotary shaft extending vertically in said connection, a shaft on said truck having driving connections at one end to be operated from the motor of said truck unit and geared to said rotary shaft, and another shaft on said trailer geared to said rotary shaft at one end and connected with a device on said trailer to operate the same.

6. The combination with a truck unit, a trailer unit, a hoist on said trailer unit, and a fifth wheel between said units, of means operable and controlled on said truck unit and having a shaft connection extending through said fifth wheel for operating said hoist.

7. The combination with a truck unit, a trailer unit, a hoist on said trailer unit, and a fifth wheel between said units, of a driven shaft on said truck unit, a control clutch, and transmission from the driven shaft through the center of the fifth wheel to the hoist for operating the latter, arranged to maintain the same relation with the hoist and the driven shaft in all positions to which the truck turns with respect to the trailer.

8. The combination with a truck, a trailer having a hoist thereon, a fifth wheel providing a swivel support for said trailer upon said truck, and means providing a swivel connection between said truck and trailer comprising interfitting hollow housing sections at the center of said fifth wheel, of means for operating said hoist comprising a driving member on said truck extending into one of said housing sections, a driven member on said trailer having operative connection with said hoist and extending into the other of said housing sections, and a driving connection between said members, said connection extending axially in said fifth wheel through said housing sections and having driving connection with said members.

9. The combination of a truck, a trailer, said trailer having a dumping body, a hoist carried on the frame of said trailer for operating said body, a fifth wheel providing for relative swivel movement between said truck and trailer, said trailer and truck being adapted to have limited longitudinal movement relative to each other in operation, and means for operating said hoist comprising a drive member on said truck, a driven member on said trailer, and an intermediate member extending through said fifth wheel to provide a driving connection between said members, said intermediate member having an extensible driving connection with one of the other of said members to maintain driving relation therewith in the relative longitudinal movement between said trailer and said tractor.

10. The combination of a truck unit, a trailer unit having a dumping body, a hoist on the frame of said trailer unit for operating said body, a fifth wheel between said units to provide for relative swivel movement therebetween, means between said fifth wheel and one of said units constituting a universal joint connection whereby to provide for relative tilting of said units in operation upon the road, and means for operating said hoist comprising a drive member on said truck unit, a driven member on said trailer unit, and an intermediate member extending through said fifth wheel to provide a driving connection between said members, said intermediate member having universal driving connections with one of the other of said members to maintain driving relation therewith in all relative positions of said units.

11. The combination of a truck unit, a trailer unit having a dumping body, a hoist on the frame of said trailer unit for operating said body, a fifth wheel providing for relative swivel movement between said units, means between said fifth wheel and one of said units constituting a lost motion universal joint connection whereby to provide for relative longitudinal movements and tilting between said units in operation, and means for operating said hoist comprising a drive member on said truck unit, a driven member on said trailer unit, and an intermediate member extending through said fifth wheel providing driving connection between said members, said intermediate member having an extensible universal driving connection with one of the other of said members to maintain driving relation therewith in all relative positions of said units.

12. The combination of a power driven truck, a trailer connected to said truck and having a hoist thereon, a fifth wheel in the connection between said truck and trailer, a hollow housing at the center of said fifth wheel, a drive shaft extending into said housing having a driving connection with the power unit of said truck, a driven shaft extending into said housing having connection with said hoist to operate the same, and an intermediate shaft in said housing extending axially with respect to said fifth wheel and providing a driving connection for said driven shaft with said drive shaft.

13. The combination with a truck and a trailer, of a fifth wheel structure therebetween comprising a lower circle rigidly mounted on said truck, an upper circle turning thereon, a driving member on said truck, rigid transmission members driven therefrom and extending up through the center of said fifth wheel, flexible and extensible transmission members driven from said rigid members for operating a device on said trailer, and means providing a flexible and extensible connection between said trailer and said upper fifth wheel circle.

14. The combination with a truck and a trailer, of a fifth wheel structure therebetween comprising a stationary rigidly mounted lower circle on the truck, a rigidly mounted lower hollow housing section central with respect to said lower circle, an upper circle turnable on said lower circle and connected to said trailer, an upper hollow housing section swivelled on said lower section, shafts extending into each of said sections, one being a driver and the other a driven shaft, and transmission gearing mechanism in said housing between said shafts, said shaft extending into said upper housing section having a connection with a device on said trailer and being arranged to swing and with it said upper housing section with the trailer in its movements about the fifth wheel as a center.

15. The combination of a truck, a trailer, a fifth wheel structure to provide for relative pivotal movement between said truck and trailer comprising a lower circle rigidly and stationarily mounted on said truck, an upper circle turnable on said lower circle, a rectangular subframe pivotally mounted between the sides of said trailer to permit relative oscillatory movement between said subframe and trailer on an axis longitudinally of the trailer, shoes slidable longitudinally relative to the sides of said subframe, and spring means yieldingly restraining such movement, said shoes being pivotally connected to said upper fifth wheel circle to permit relative oscillatory movement between said subframe and said upper fifth wheel circle on an axis laterally of the trailer.

16. The combination of a truck, a trailer, a fifth wheel structure providing for relative pivotal movement between said truck and trailer, comprising a lower circle rigidly and stationarily mounted on said truck, an upper circle turning on the lower circle, a rectangular subframe pivotally mounted on two of its sides on the forward portion of said trailer providing for relative oscillatory movement between said subframe and trailer on one axis, and means providing a connection between said upper fifth wheel circle and the other two sides of said subframe permitting relative oscillatory movement between said subframe and said upper fifth wheel circle on an axis at right angles to the other axis.

17. The combination of a truck, a trailer, a fifth wheel structure providing for relative pivotal movement between said truck and trailer, comprising a lower circle rigidly and stationarily mounted on said truck, an upper circle turning on the lower circle, a rectangular subframe pivotally mounted on two of its sides on the forward portion of said trailer providing for relative oscillatory movement between said subframe and trailer on one axis, means providing a connection between said upper fifth wheel circle and the other two sides of said subframe permitting relative oscillatory movement between said subframe and said upper fifth wheel circle on an axis at right angles to the other axis, and means operating lengthwise of two sides of said subframe providing a certain degree of relative longitudinal movement between said truck and trailer.

18. The combination in a connection for a truck unit and trailer unit, of a fifth wheel structure providing for relative pivotal movement between said units comprising a circle rigidly and stationarily mounted on one of said units, another circle turning thereon, a rectangular frame pivotally mounted between the sides of the other of said units to permit relative oscillatory movement on an axis longitudinally of said unit, shoes fitting on the sides of said frame and slidable longitudinally thereon having a pivotal connection with the last mentioned circle to permit relative oscillatory movement between said shoes and said circle on an axis extending transversely to said units when in trailing relation, and spring means in front and in back of said shoes operating between abutments on said subframe and said shoes to yieldingly restrain movement thereof.

19. The combination with a truck unit, a trailer unit, and a device joining said units and comprising a fifth wheel, of a driving shaft on said truck, a driven operating shaft on said trailer, and an intermediate mechanical drive connection between said driving and driven shaft extending through the fifth wheel.

20. The combination with a truck unit and a trailer unit having coacting fifth wheel halves for swivelling said trailer on said truck, of a pair of hollow interfitting housing sections arranged axially in said fifth wheel and serving to maintain the said halves in proper operative relation for relative swivelling movement, a driving shaft on one of said units extending into one of said housing sections, transmission means in said housing, and a driven operating shaft on the other of said units extending into the other of said housing sections and arranged to have driving relation with said transmission means.

21. The combination in a connection for a truck unit and trailer unit, of a fifth wheel structure providing for relative pivotal movement between said units comprising a circle rigidly and stationarily mounted on one of said units, another circle turning thereon, a rectangular frame pivotally mounted between the sides of the other of said units to permit relative oscillatory movement on an axis longitudinally of said unit, and shoes fitting on the sides of said subframe and slidable longitudinally thereon, said shoes having a pivotal connection with the last mentioned circle to permit relative oscillatory movement between said shoes and said circle on an axis extending transversely to said units when in trailing relation.

22. The combination of a truck, a trailer, a fifth wheel structure permitting relative pivotal movement between the truck and trailer comprising upper and lower circles, the latter of which is rigidly and stationarily mounted on said truck and has the other of said circles turning thereon, a rectangular subframe of channeled pieces having a front and rear pivotal connection in the frame of said trailer to permit relative sidewise oscillatory movement therebetween, a pair of shoes having pivotal connection at opposite sides of the upper fifth wheel circle to permit relative forward and backward oscillatory movement therebetween and having slidable engagement with flanges of the channeled side pieces of said subframe, abutments forwardly and rearwardly disposed in spaced relation to said shoes on said side pieces, and compression springs acting between said shoes and said abutments.

23. The combination of a truck, a trailer, a fifth wheel structure permitting relative pivotal movement between the truck and trailer comprising upper and lower circles, the latter of which is rigidly and stationarily mounted on said truck and has the other of said circles turning thereon, a rectangular subframe having a front and rear pivotal connection in the frame of the trailer to permit relative sidewise oscillatory movement therebetween, a pair of shoes having pivotal connections at opposite sides of the upper fifth wheel circle permitting relative forward and backward oscillatory movement therebetween and arranged beneath the side pieces of said subframe, abutments in front and in back of said shoes rigidly mounted on said side pieces, guide rods extending between said abutments having said shoes reciprocable thereon, and compression springs coiled on said rods between said abutments and said shoes.

24. In a semi-trailer, a truck unit, a trailer having rear trailing supporting wheels and resting at its forward end on said truck, and a universal connection between said units, of a rotary shaft extending axially relative to said connection, a flexible shaft on said truck having gearing connections with said rotary shaft and extending forwardly to be driven from the motor of said truck, and another flexible shaft on said trailer having gearing connections with said rotary shaft and extending therefrom to a hoist on said trailer to operate the same.

In testimony whereof we have hereunto affixed our signatures.

ADDI B. CADMAN.
EDWIN H. ALLEN.